United States Patent
Pirzadeh et al.

(10) Patent No.: US 10,613,849 B2
(45) Date of Patent: Apr. 7, 2020

(54) UPDATE MIGRATION SYSTEM AND METHOD

(71) Applicants: Kiushan Pirzadeh, Foster City, CA (US); Philippe Martin, Foster City, CA (US); Michael Lindbeck, Foster City, CA (US); Yuexi Chen, Foster City, CA (US); Marc Kekicheff, Foster City, CA (US)

(72) Inventors: Kiushan Pirzadeh, Foster City, CA (US); Philippe Martin, Foster City, CA (US); Michael Lindbeck, Foster City, CA (US); Yuexi Chen, Foster City, CA (US); Marc Kekicheff, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 15/274,856

(22) Filed: Sep. 23, 2016

(65) Prior Publication Data

US 2018/0088924 A1    Mar. 29, 2018

(51) Int. Cl.
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
CPC .................................................. G06F 8/60–65
(Continued)

(56) References Cited

U.S. PATENT DOCUMENTS 5,999,740 A * 12/1999 Rowley .................... G06F 8/65
709/221
6,738,801 B1 * 5/2004 Kawaguchi ............... G06F 8/65
709/208

(Continued)

FOREIGN PATENT DOCUMENTS

CN       102652306 A *  8/2012  ............. G06F 8/656
JP         4864557 B2 *  2/2012  ............... G06F 8/65

OTHER PUBLICATIONS

Kolb et al., "Application Migration Effort in the Cloud", Dec. 2015, Services Transactions on Cloud Computing, vol. 3, No. 4 (Year: 2015).*

(Continued)

*Primary Examiner* — Wei Y Zhen
*Assistant Examiner* — Junchun Wu
(74) *Attorney, Agent, or Firm* — Loeb & Loeb LLP

(57) ABSTRACT

A device updating system may store data from an application to be updated, especially personalization data that is to be persisted beyond the version update. After the data is stored, the application may be deleted and a migration application is installed. The migration application may use a matrix or the like characterizing differences between prior editions of the application and the one being installed. The migration application may determine the previous edition and updates the personalization data according to the matrix. After the data is updated, the migration application may be deleted and the new application installed. The new application may retrieve the updated data and may be ready to operate without concern about what the previous edition may have been. Memory space may be conserved by not requiring the new application to carry the version matrix and all possible changes between the current edition and all possible previous editions.

17 Claims, 14 Drawing Sheets

(58) Field of Classification Search
USPC .................................................... 717/170
See application file for complete search history.

(56) References Cited

U.S. PATENT DOCUMENTS

| | | | | |
|---|---|---|---|---|
| 6,795,835 | B2* | 9/2004 | Ricart | G06F 9/44505 |
| 7,155,462 | B1* | 12/2006 | Singh | G06F 8/65 |
| | | | | 717/170 |
| 7,263,698 | B2* | 8/2007 | Wildhagen | G06F 8/656 |
| | | | | 717/170 |
| 8,850,423 | B2* | 9/2014 | Barkie | G06F 8/63 |
| | | | | 717/176 |
| 9,411,576 | B2* | 8/2016 | Hocker | G06F 8/71 |
| 9,417,865 | B2* | 8/2016 | Vidal | G06F 8/65 |
| 2006/0086785 | A1* | 4/2006 | Sakata | G06F 8/65 |
| | | | | 235/380 |
| 2007/0266059 | A1* | 11/2007 | Kitamura | G06F 17/30997 |
| 2008/0163198 | A1* | 7/2008 | Rao | G06F 8/61 |
| | | | | 717/177 |
| 2009/0144718 | A1* | 6/2009 | Boggs | G06F 8/65 |
| | | | | 717/170 |
| 2010/0017505 | A1* | 1/2010 | Kamada | G06F 8/60 |
| | | | | 717/168 |
| 2011/0107327 | A1* | 5/2011 | Barkie | G06F 8/63 |
| | | | | 717/176 |
| 2012/0144382 | A1* | 6/2012 | Matthew | G06F 8/656 |
| | | | | 717/173 |
| 2013/0094044 | A1* | 4/2013 | Harada | G06F 3/1205 |
| | | | | 358/1.13 |
| 2013/0139230 | A1 | 5/2013 | Koh | |
| 2013/0198722 | A1* | 8/2013 | Adams | G06F 11/3428 |
| | | | | 717/127 |
| 2013/0346960 | A1* | 12/2013 | Gupta | G06F 8/65 |
| | | | | 717/170 |
| 2014/0223152 | A1* | 8/2014 | Deedwaniya | G06F 9/44505 |
| | | | | 713/1 |
| 2014/0223423 | A1* | 8/2014 | Alsina | G06F 8/65 |
| | | | | 717/173 |
| 2015/0193221 | A1* | 7/2015 | Khan | G06F 8/65 |
| | | | | 713/176 |
| 2016/0103675 | A1 | 4/2016 | Aabye | |
| 2017/0329599 | A1* | 11/2017 | Choi | G06F 8/61 |

OTHER PUBLICATIONS

Pant et al., "Data Migration Across the Clouds", May 2013, International Journal of Soft Computing and Engineering, vol. 3, Issue 2 (Year: 2013).*

Sapuntzakis et al., "Optimizing the Migration of Virtual Computers", Dec. 2002, ACM (Year: 2002).*

Dig, "Using Refactorings to Automatically Update Component-Based Applications", Oct. 2005, ACM (Year: 2005).*

PCT International Search Report and Written Opinion for PCT/US17/53280 dated Dec. 11, 2017, 12 pages.

* cited by examiner

UPDATE MIGRATION SYSTEM AND METHOD

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Upgrading applications has been done for generations of electronic devices, from operating systems to programs such as word processors. The process generally involves removing and replacing the application and then re-creating any personalization data such as user dictionaries, bookmarks or the like. In other applications, the new version application may be able to read and incorporate the personalization data used by the previous version application. However, when updating over several generations of updates, the newly installed version may not be able successfully resolve differences in personalization data over multiple generations of updates. In some cases, when updating over multiple versions, a user may be required to successively update in sequence from version to version in order to complete an update to the latest version.

SUMMARY

A process for updating over an unknown number of editions of applications may use a migration application that evaluates a span between the current edition and a new edition and modifies personalization data appropriate for the new edition in view of the existing data. The migration application may, in an embodiment, a matrix indicating differences between old and new fields and objects and between each possible edition as well as initial values for fields that are new between a particular set of old and new editions. After storing the personalization data from the current (old) edition, the old edition may be deleted, making room for the migration application. After updating the personalization data to meet the requirements of the new edition, the migration application may be deleted and the new edition may be installed. After installation, the new edition may be able to retrieve the updated personalization data and begin operation with little or no impact on the user.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Computer applications routinely get updated from old versions to new versions. In most cases the updates are applied consecutively from one version to the next, often by an automatic update routine that runs in the background on the computer. Data specific to a user or an instance of an application such as dictionaries, preferences, system specific settings, etc., are stored so that the updated application can retrieve and update the data according to the requirements of the newly-installed application. However, in many current devices whether to update or not is often in the hands of a user who may not be diligent about always installing updates as they are available.

For example, in a mobile phone, tablet, laptop, or other portable device, the user simply may not remember or have interest in performing an update when in a suitable environment, for example, with wall power and with the needed time. Thus, an edition of an application may have missed five, six, or even more minor updates and one or more major updates. In the prior art model, the newly installed application must be capable of reconstructing data and data format changes from the earliest editions of the application to the current edition. This is true even though the code used for processing updates to this personalization data is used only one time and only before the application begins operation for its intended use. In limited memory environments such as a secure element in a chip card or portable electronic device, where application memory is at a premium, a new edition application may not be able to include "single use" update code for all possible combinations of past editions.

FIGS. 1-9 illustrate various states of a device 100 implementing the disclosed update migration system and method. The device 100 may be any of a number of computing platforms including but not limited to a smart phone, a tablet, a laptop, a portable payment device or desktop computer. The device 100 may further be any of a number of special use devices such as, but not limited to, industrial process controllers, contacted or contactless access control cards, as well as contacted or contactless payment cards (chip cards). The current disclosure is particularly well-suited to a device 100 that has a limited amount of memory for application storage. For the purpose of illustration, without limitation, FIGS. 1-9 refer to an exemplary embodiment in a smart phone, wearable device or similar devices.

Figure 1:
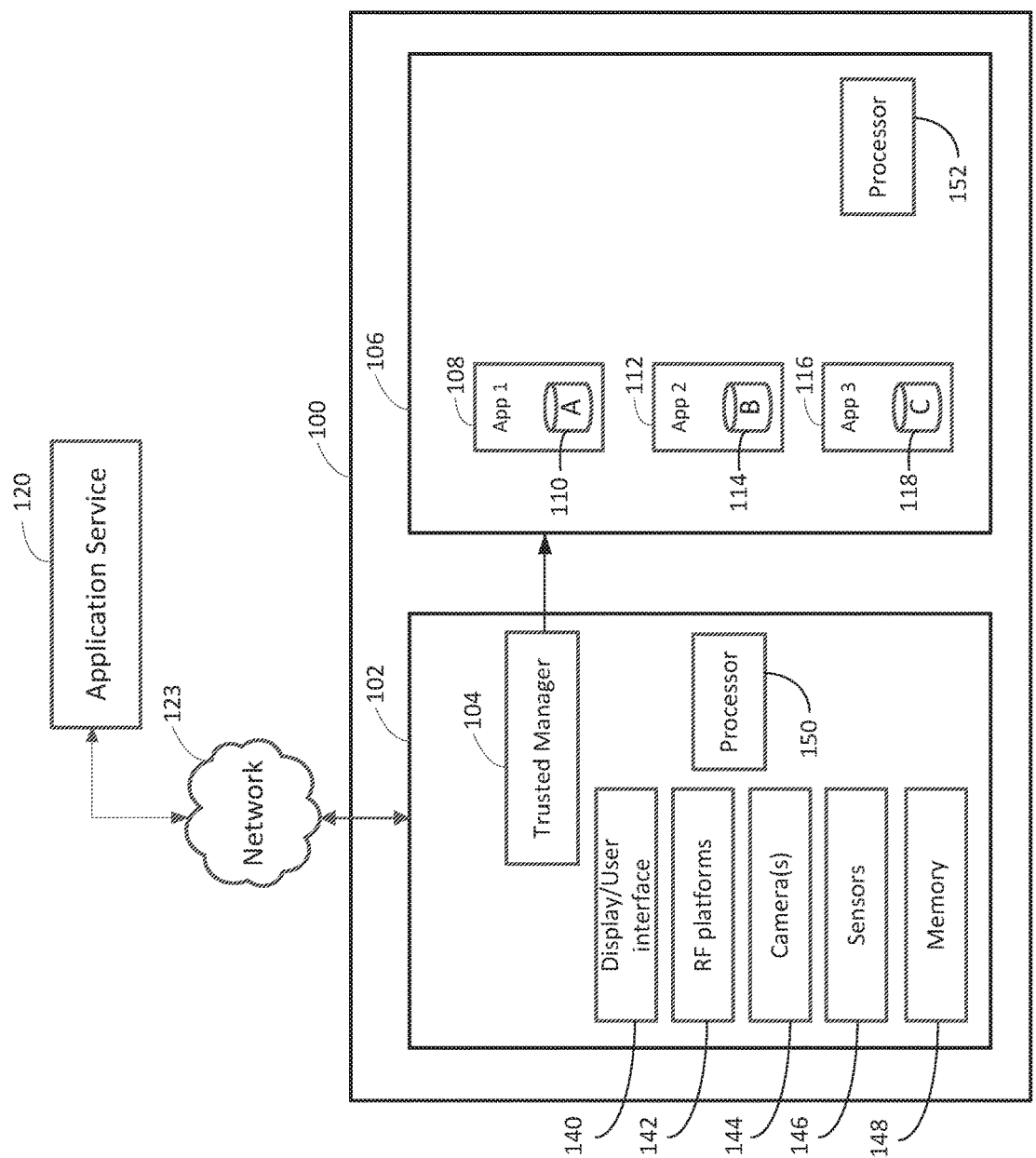
FIG. 1 is a block diagram a system supporting the application update technique in accordance with the current disclosure.

The device 100 of FIG. 1 shows generally an operating platform 102 that has well-known components related to operation of a smart phone as an original or companion device including a display 140 that may be a touch screen supporting a user interface, various radio platforms 142 including cellular voice and data, Bluetooth, Wi-Fi, GPS, and near field communication (NFC). The operating platform 102 may also include other components including one or more cameras 144, temperature and motion sensors 146, as well as a processor 150 and memory 148 for executing applications. These elements are not repeated in the remaining illustrations for the sake of clarity.

The operating platform 102 may also include a trusted manager 104. The trusted manager 104 may be, in one embodiment, a trusted service manager such as is used in a nearfield communication ecosystem. In another embodiment, the trusted manager 104 may be a controlling authority based scheme the same as or similar to that defined in the GlobalPlatform Card specification. The trusted manager 104 may be responsible for interactions with the secure element 106 discussed below. In other embodiments not using a secure element 106, the trusted manager 104 may simply be an update process used by an operating system of the device 100. The trusted manager 104 may be in charge of, among other things, updating the device 102 with new versions of operating system and other core functions including near-field communication interface management.

The device 100 may also include a secure element 106. The secure element 106 may include a processor 152 and one or more applications 108, 112, 116. Each application may include respective personalization data 110, 114, 118. The personalization data of each of these applications may include user identity information, issuer identity, recent payment history, PIN values, key material, etc. Each application 108, 112, 116, may be associated with a different issuer not only in the area of payment but also access control, identity verification, transit, etc. In the illustration discussed below, each of the applications will be updated, but in practice, any of the applications could be updated individually following the same process.

Figure 2:
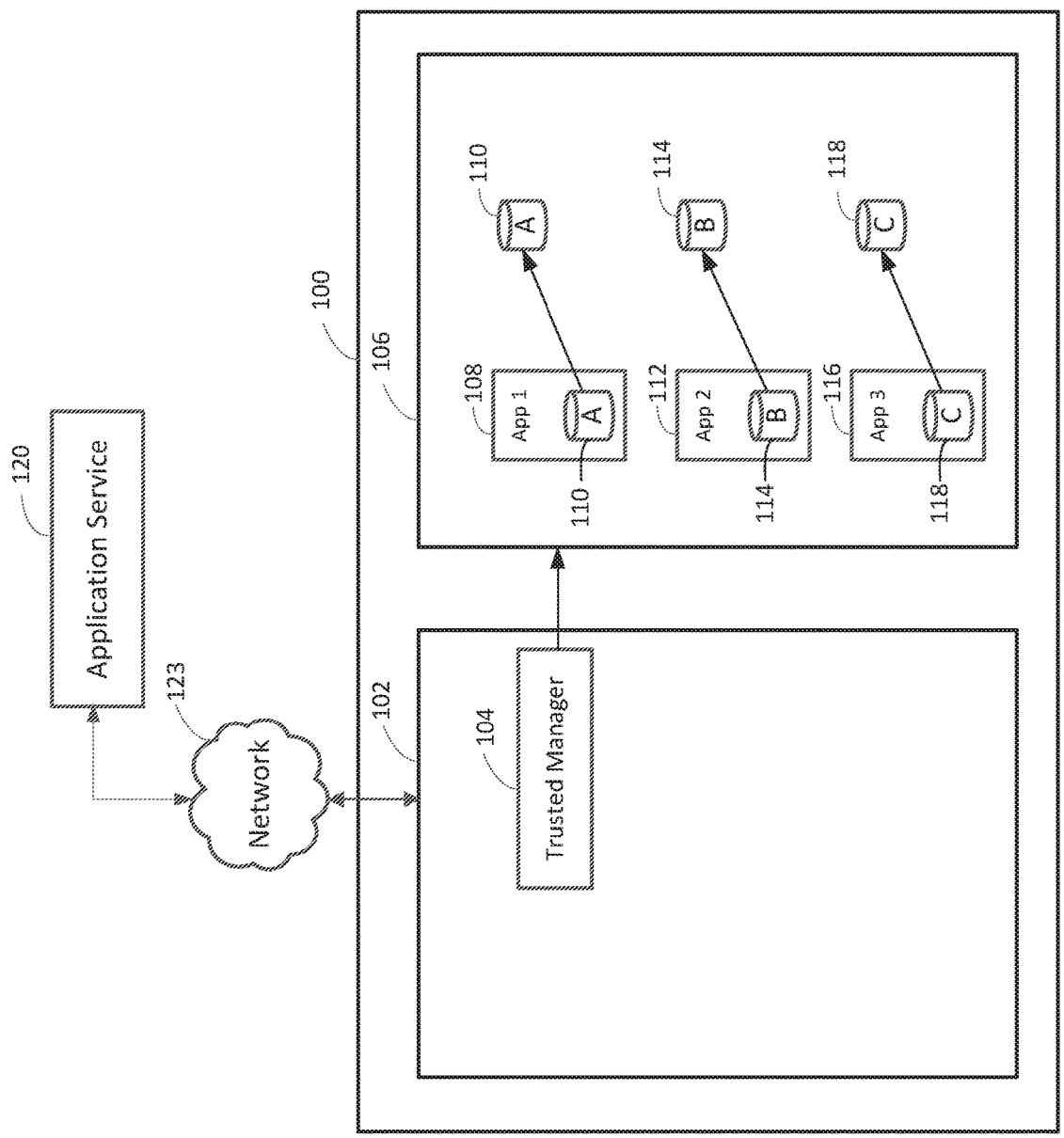
FIG. 2 is a block diagram illustrating a state of the system during the update.
Figure 3:
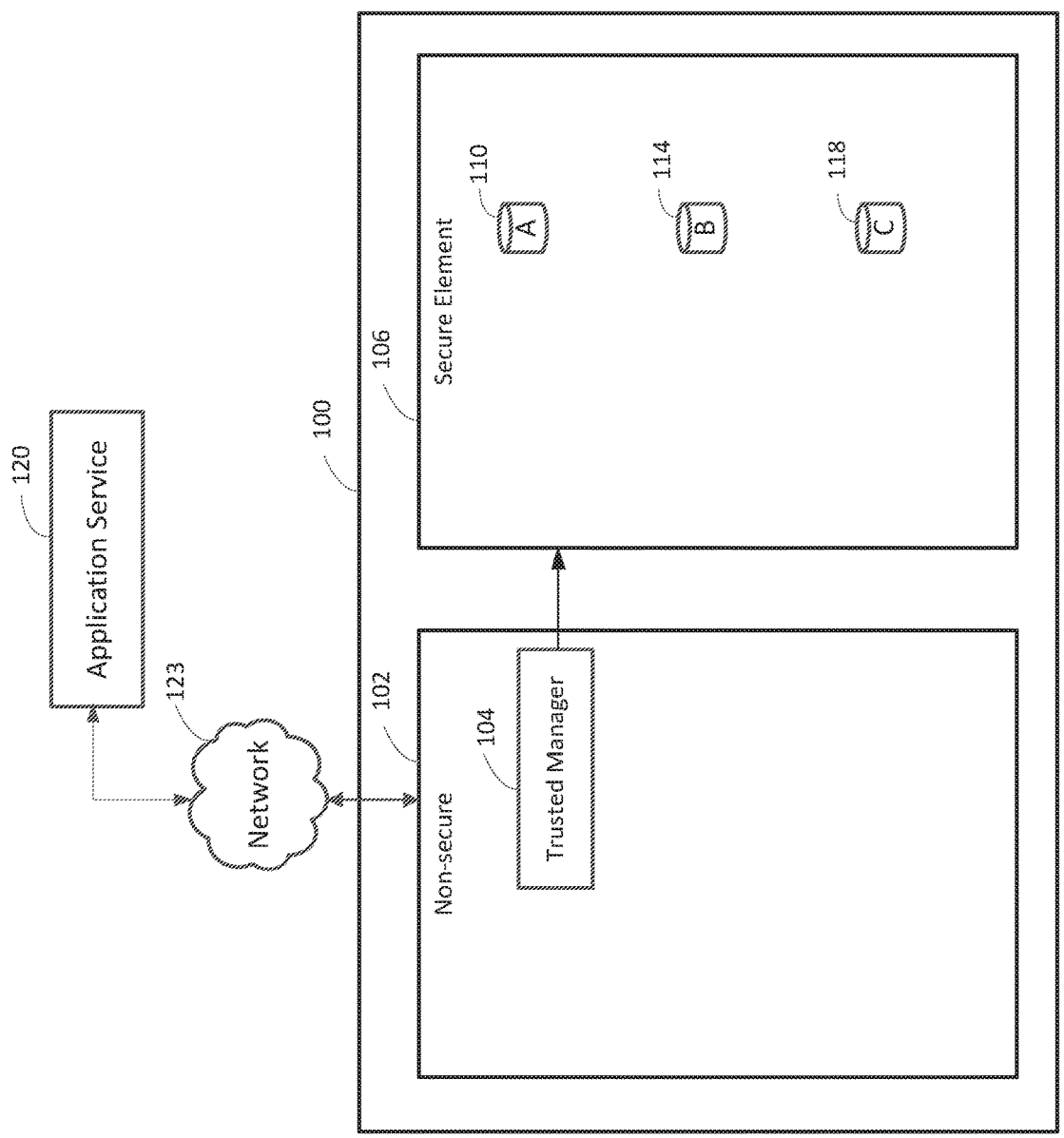
FIG. 3 is a block diagram illustrating a state of the system during a continuation of the update.

The trusted manager 104, after determining that an update is to be performed, may communicate a signal to the applications 108, 112, 116 to begin the update process. Turning to FIG. 2, each of the applications 108, 112, 116 may export or simply store its respective personalization data 110, 114, 118 within the confines of the secure element 106 so that no personal information is put at risk by copying it outside the secure element 106. As illustrated in FIG. 3, the trusted manager 104 may delete each of the applications 108, 112, 116.

Figure 4:
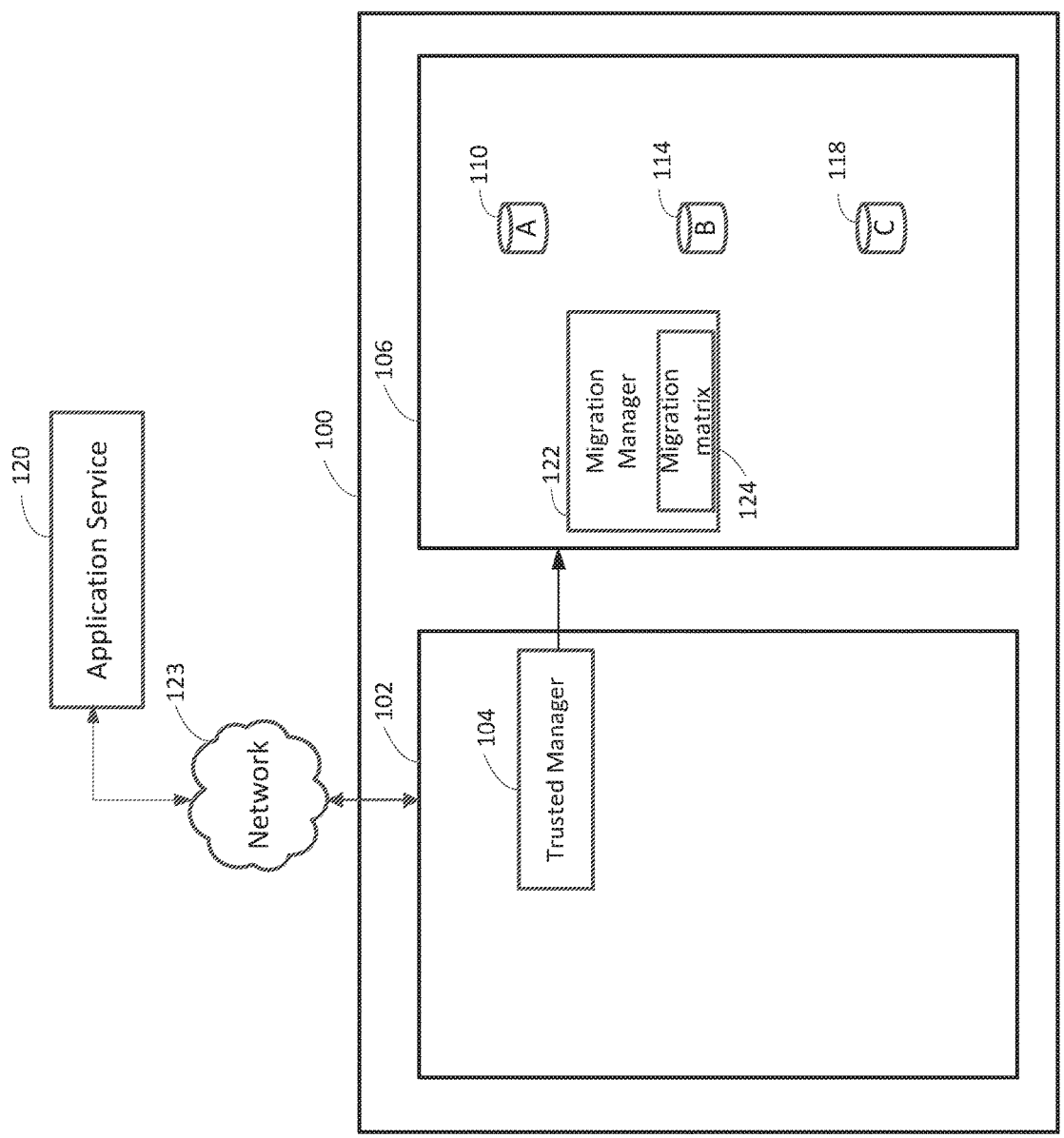
FIG. 4 is a block diagram illustrating a state of the system during a continuation of the update.

As shown in FIG. 4, a migration application 122 which includes a migration matrix 124 may be downloaded from an application service 120 via network 123 and installed by the trusted manager 104 in the secure element 106. The migration matrix 124, in an embodiment, may include a mapping of every prior edition of the applications being updated to the current version. It is anticipated that in some embodiments the migration application 122 and its associated migration matrix 124 may be customized for each application edition as they become available. In yet other embodiments, each application may have a separate migration application. In that case, the steps described here are repeated for each application. In an embodiment, the sole function of the migration manager 122 is to update the personalization data 110, 114, 118 from the old version to the new version. In other embodiments, the migration manager 122

Table 1 illustrates an exemplary portion of a migration matrix 124 for the application 108 showing changes or conversions to be performed between the previously installed edition of the application 108 and the new edition to be installed. Note that no listing is shown for changes between most recent edition, version 3 and the latest edition version 4. In an embodiment this is simply because there are no version changes between editions 3 and 4. In another embodiment, however, the migration application may understand that the software of edition 4 is capable of recognizing and updating changes from the most recent edition, that is, edition 3. Therefore, the migration application 122 may not need to perform those changes and may move on to another application or simply report that the necessary changes are complete so that the trusted service manager 104 can continue the process.

TABLE 1

| Previous edition | New edition | List of changes |
| --- | --- | --- |
| 0 | 4 | Remove SFI 1 record 1<br>Add SFI 3 record 1<br>Add SFI 3 record 2<br>Add SFI 3 record 3<br>Prepare placeholder for CRT components<br>Add PAR for in-app<br>Update ECI value<br>Switch to CVN42<br>. . . |
| 1 | 4 | Remove SFI 1 record 1<br>Switch to CVN42<br>. . . |
| 2 | 4 | Switch to CVN42<br>. . . |

Figure 5:
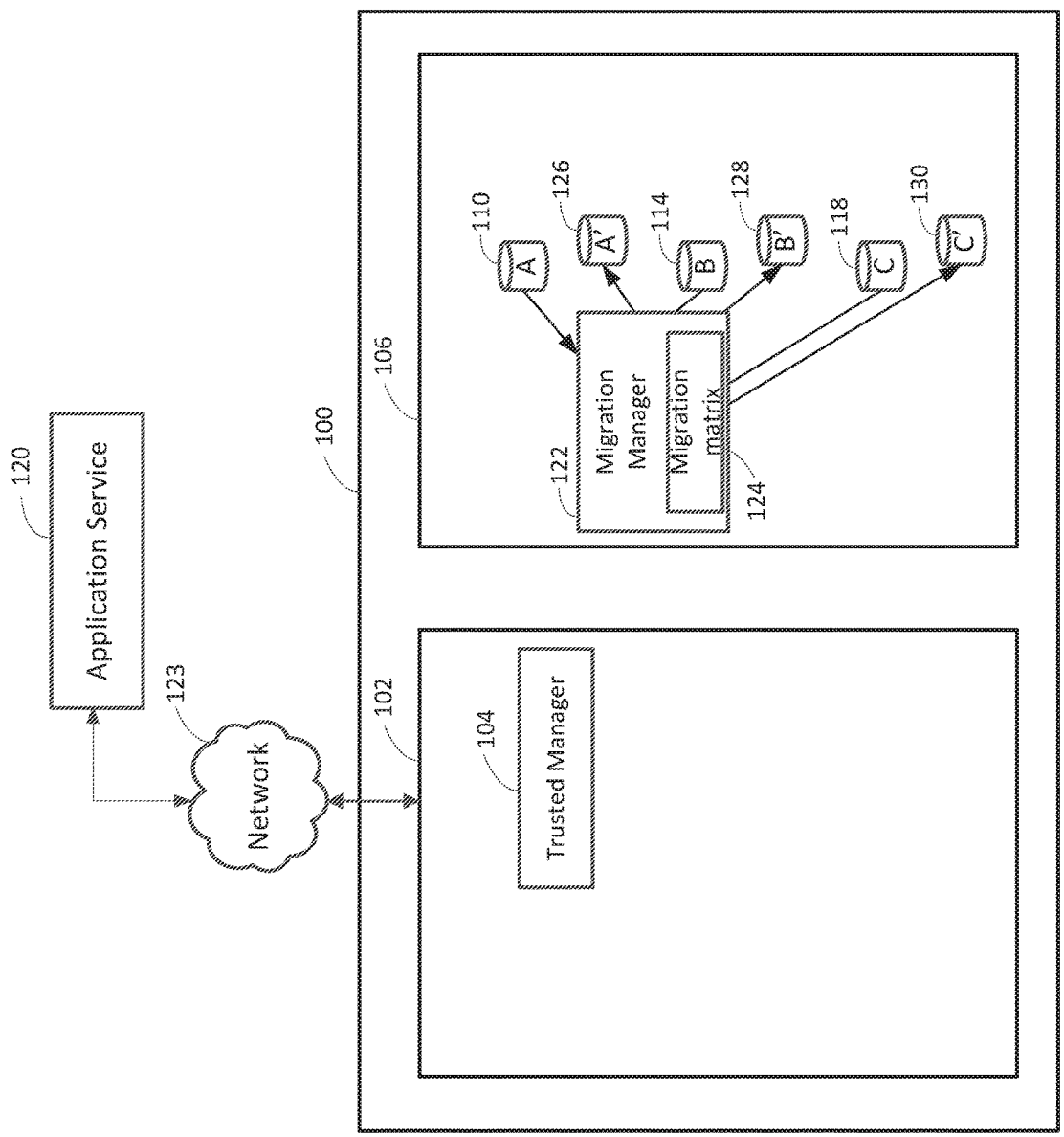
FIG. 5 is a block diagram illustrating a state of the system during a continuation of the update.

Turning to FIG. 5, the migration application 122 may analyze each saved data file 110, 114, 118 to determine its version. The analysis may be accomplished through an analysis of the data itself, that is, the by observing the structure and format of the data, or may, in another embodiment, simply have a version identifier embedded in the data 110, 114, 118. The migration application 122 may perform the necessary updates to the respective data files according to the migration matrix.

In the case where a new data record is added, for example, as shown in Table 1 with respect to the edition 0 to edition 4 migration, the migration application 122 may have default values for populating the newly-created records. The newly created data versions 126, 128, and 130 may be generated by the migration application 112 and stored.

In various embodiments, the migration of data may proceed in smaller steps. For example, in one embodiment, retrieving and updating data by the migration application 122 may be one step. After the new version data is generated locally, storing the updated data may be performed as a separate step. In still other embodiments, the migration matrix 124 may simply not be able to provide data for a particular field. In this case, at least a partial provisioning of the application may be required after the completion of the update process.

Figure 6:
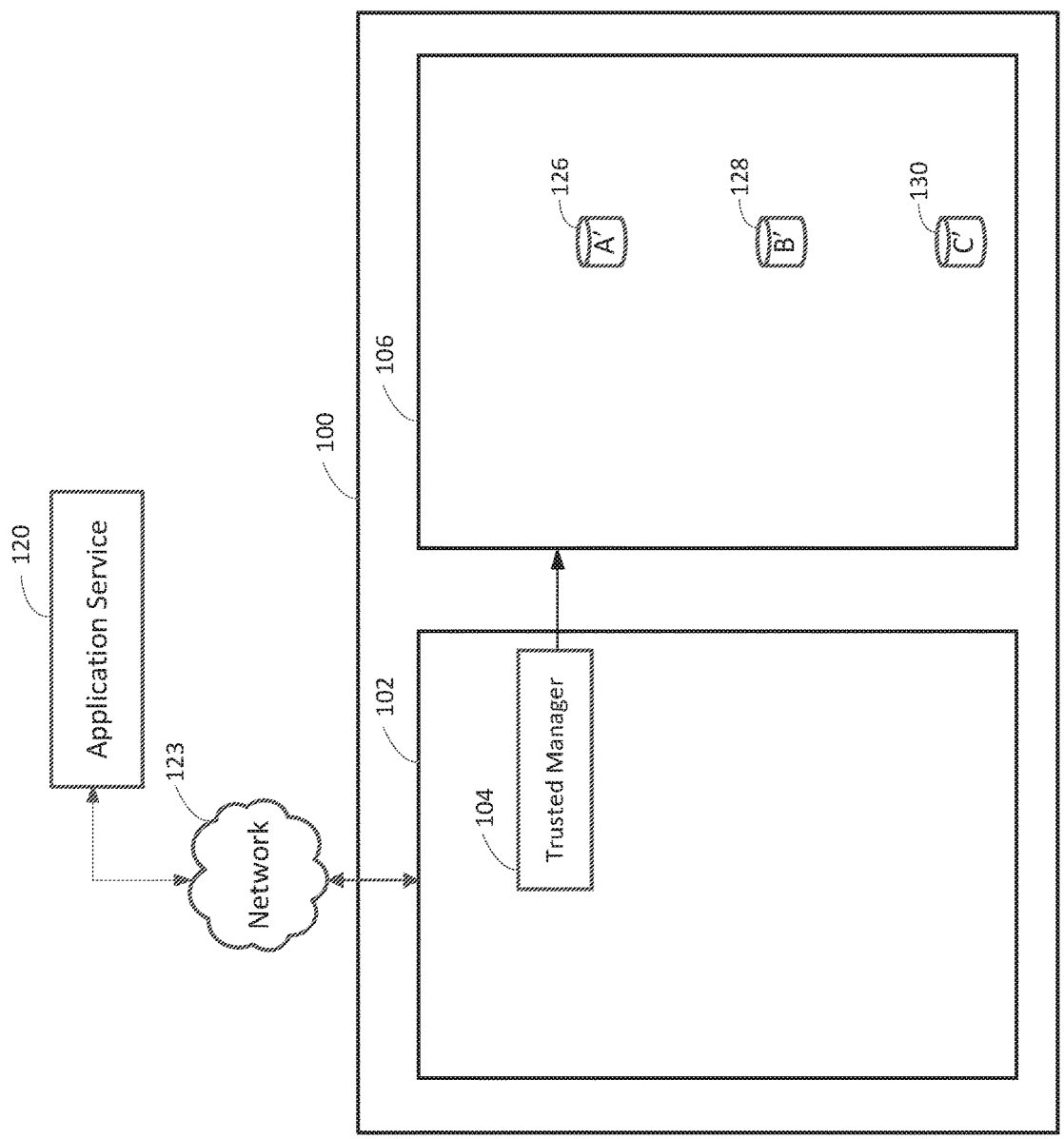
FIG. 6 is a block diagram illustrating a state of the system during a continuation of the update.

As shown in FIG. 6 of this illustration, the migration application 122 and the old version data 110, 114, 118 may be deleted. This step may be executed by the migration application 122 itself as the last step of its processing, or may be performed by the trusted manager 104. In an embodiment, the old edition data 110, 114, 118 may be saved in place until after the new edition application is installed an operating so that a rollback to the old edition may be easily accomplished if required. Personalization data is in most cases relatively small so that saving two versions may not reduce the memory sufficiently to prevent installation of the new edition application.

Figure 7:
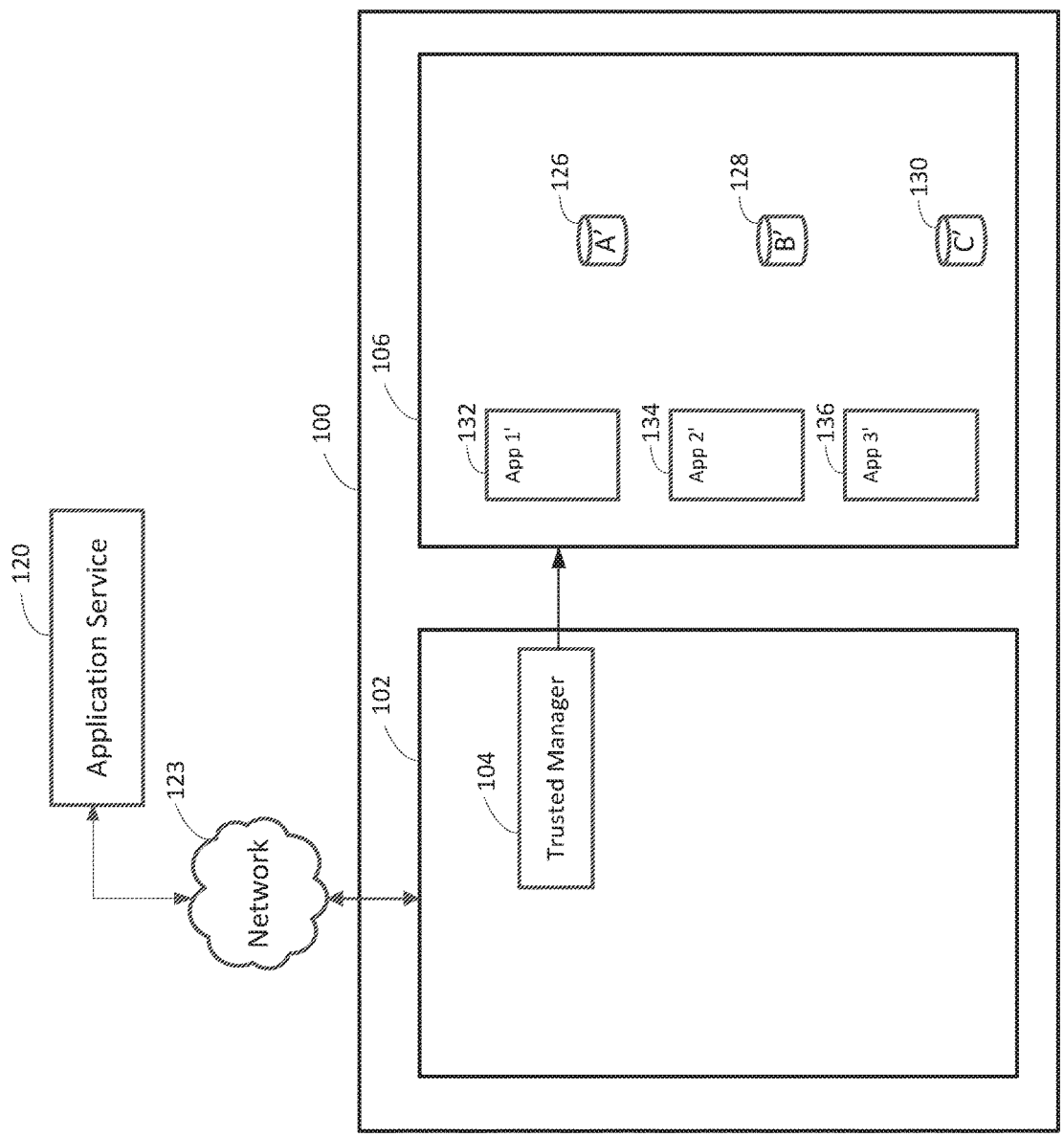
FIG. 7 is a block diagram illustrating a state of the system during a continuation of the update.
Figure 8:
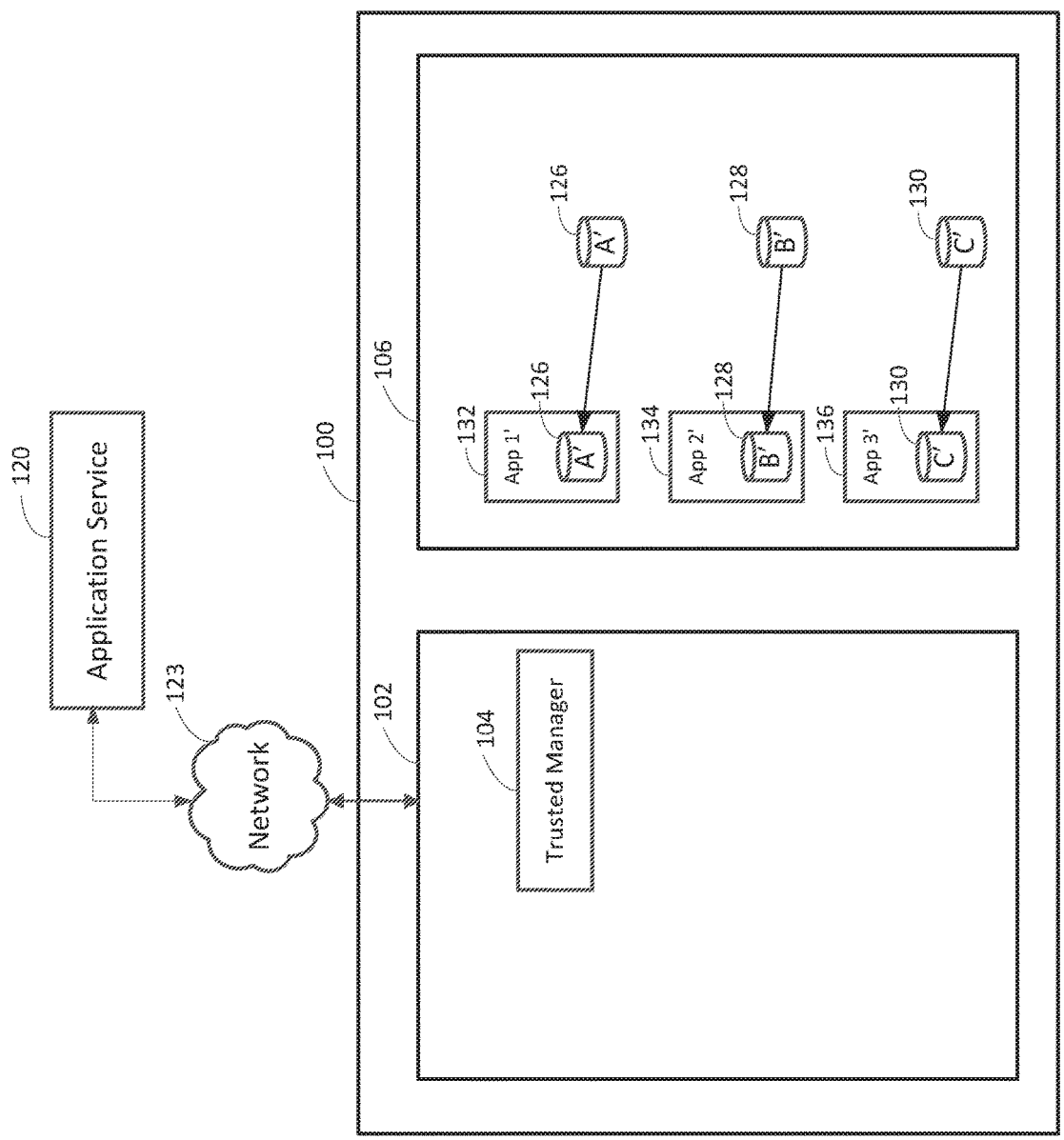
FIG. 8 is a block diagram illustrating a state of the system during a continuation of the update.
Figure 9:
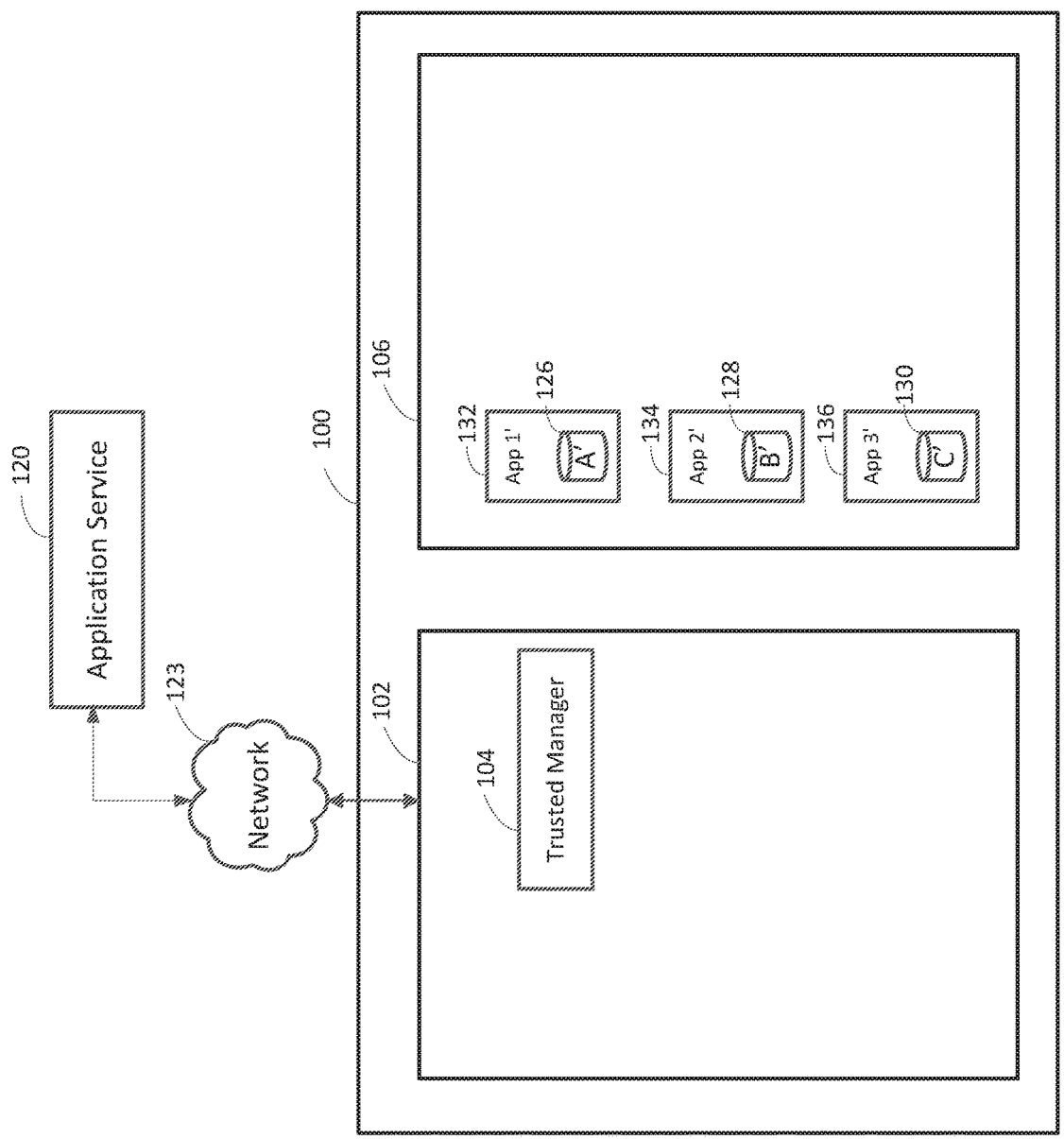
FIG. 9 is a block diagram illustrating a state of the system at a conclusion of the update.

The new edition applications 132, 134, 136 may be downloaded and installed by the trusted manager 104 as shown in FIG. 7. FIG. 8 may illustrate that the respective recently installed editions retrieve or import their associated data, which, as a result of the migration application, may already be structured and populated for use. Lastly, as shown in FIG. 9, the copies of the updated personalization data may be deleted and the updated applications 132, 134, and 136 are in an operating condition.

Figure 10:
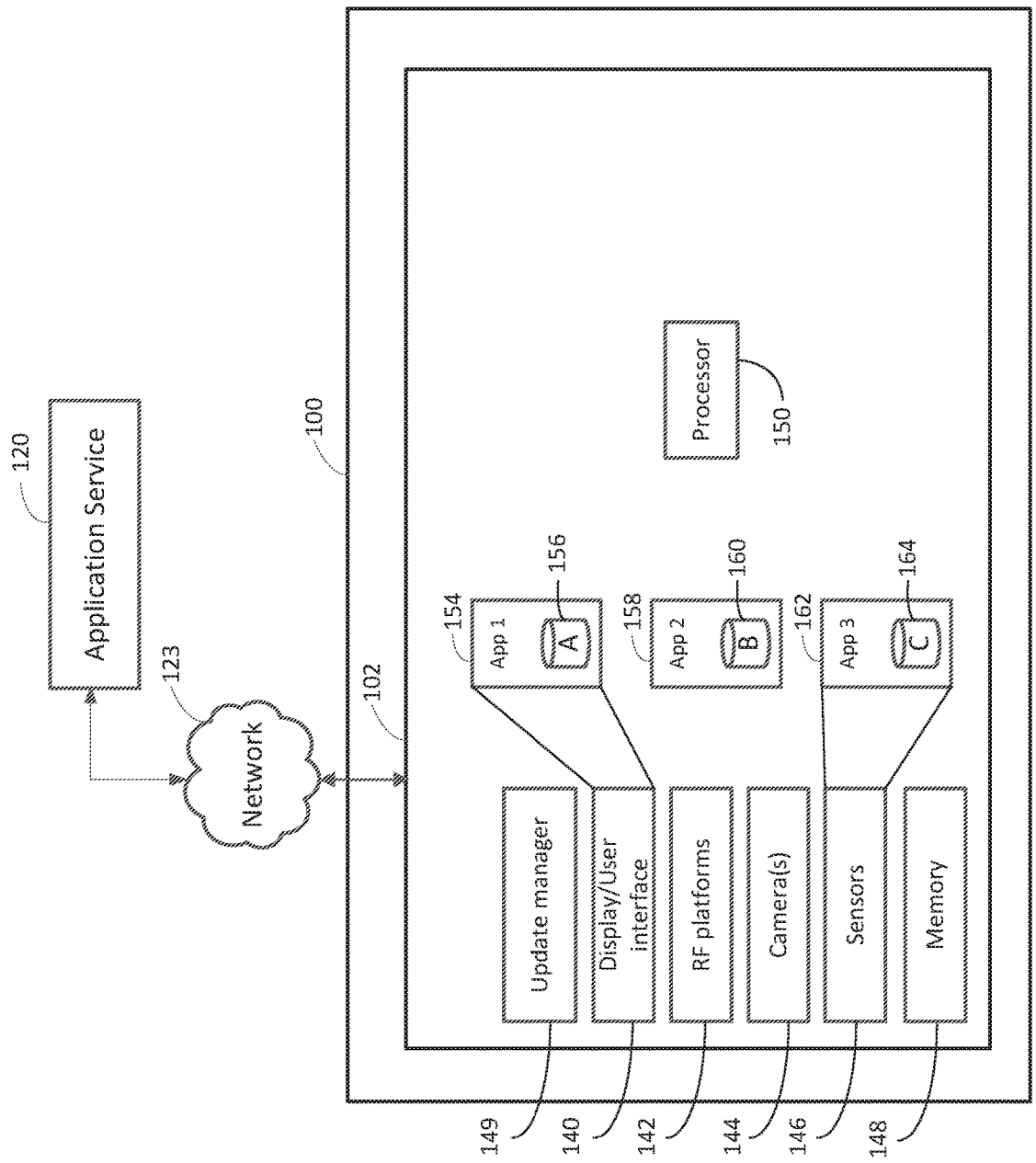
FIG. 10 is block diagram of an alternate system suitable for use of the update technique in accordance with the current disclosure.

FIG. 10 illustrates an alternative embodiment, showing that the applications being updated may be part of the services used by the device 100. An application 154 with personalization data 156 may be associated with the display 140 while an application 162 and its data 164 may operate with the sensors 146. An application 158 and its data 160 may be one of many standalone applications that are updated on an application-by-application basis. Even though technically there is much more space available outside the secure element 106, every kind of device 100 may eventually run into memory limits where the new and the old editions of applications cannot reside side-by-side during an update. In another case, an application designer may not want to have the baggage of multi-edition update support in each edition. The memory-saving technique described here may be used by an update manager 149 to perform the update process without losing user data, configuration data, or both and with little or no impact on valuable memory space. The update manager 149 may be the same as or similar to the trusted manager 104.

Figure 11:
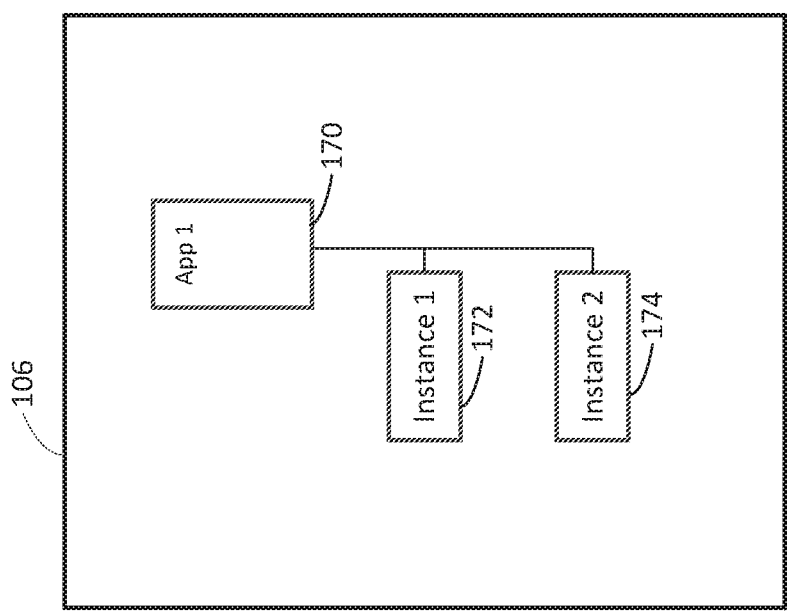
FIG. 11 is a block diagram illustrating instances in a secure element.

FIG. 11 is a block diagram illustrating another embodiment of a secure element 106 showing, in this case, that a single application 170 may be supporting multiple instantiations with different uses, for example, a coffee shop pay application 172 and a department store payment application 174. In this case, only the single copy of the application is updated, but multiple copies of personalization data may be updated by the migration application 122 using the process described herein. In such an embodiment, the instance data 172 and 174 may be stored and updated by the migration application 122 before an updated application 170 is installed.

Figure 12:
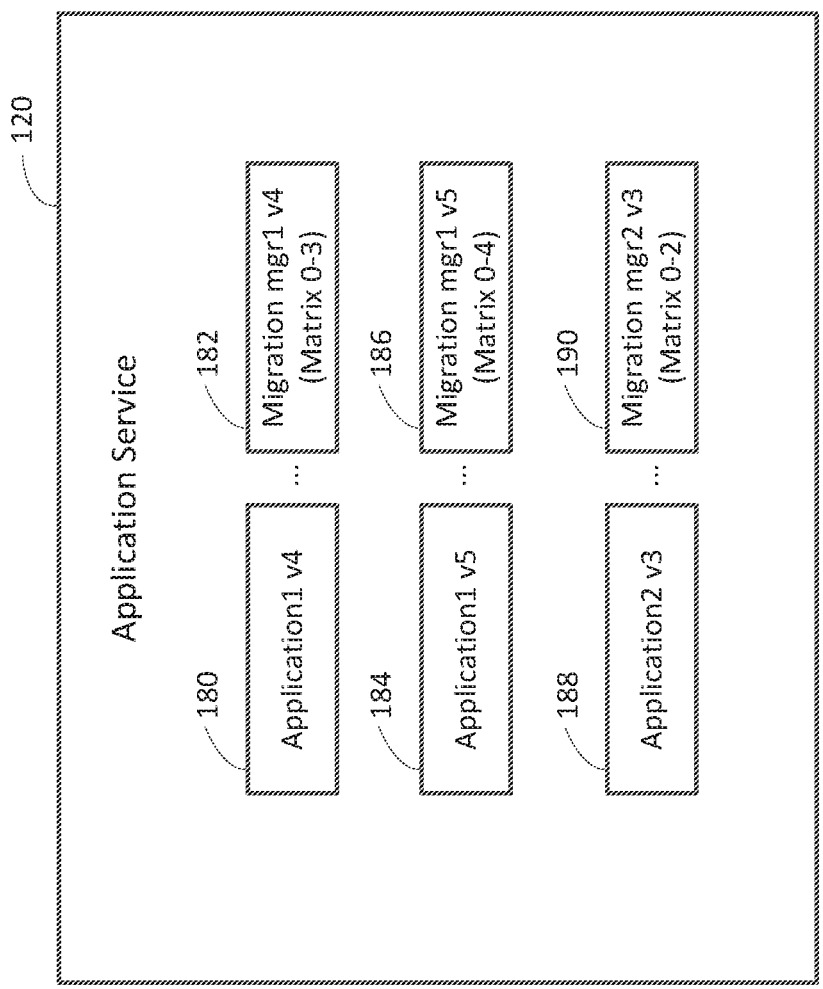
FIG. 12 is block diagram illustrating an exemplary application service in accordance with the current disclosure.

FIG. 12 is a block diagram of one embodiment of an application service 120 illustrating that for a particular edition of an application 180, a corresponding migration manager application 182 may be available. In this illustration, both a fourth edition application 180 and a fifth edition application 184 may have corresponding migration applications 182 and 186. Those migration applications 182, 186 may have respective migration matrices that support upgrades for any of the previous versions. Another application 188 at edition 3 also may have a corresponding migration manager with a migration matrix for each of the previous versions.

Figure 13:
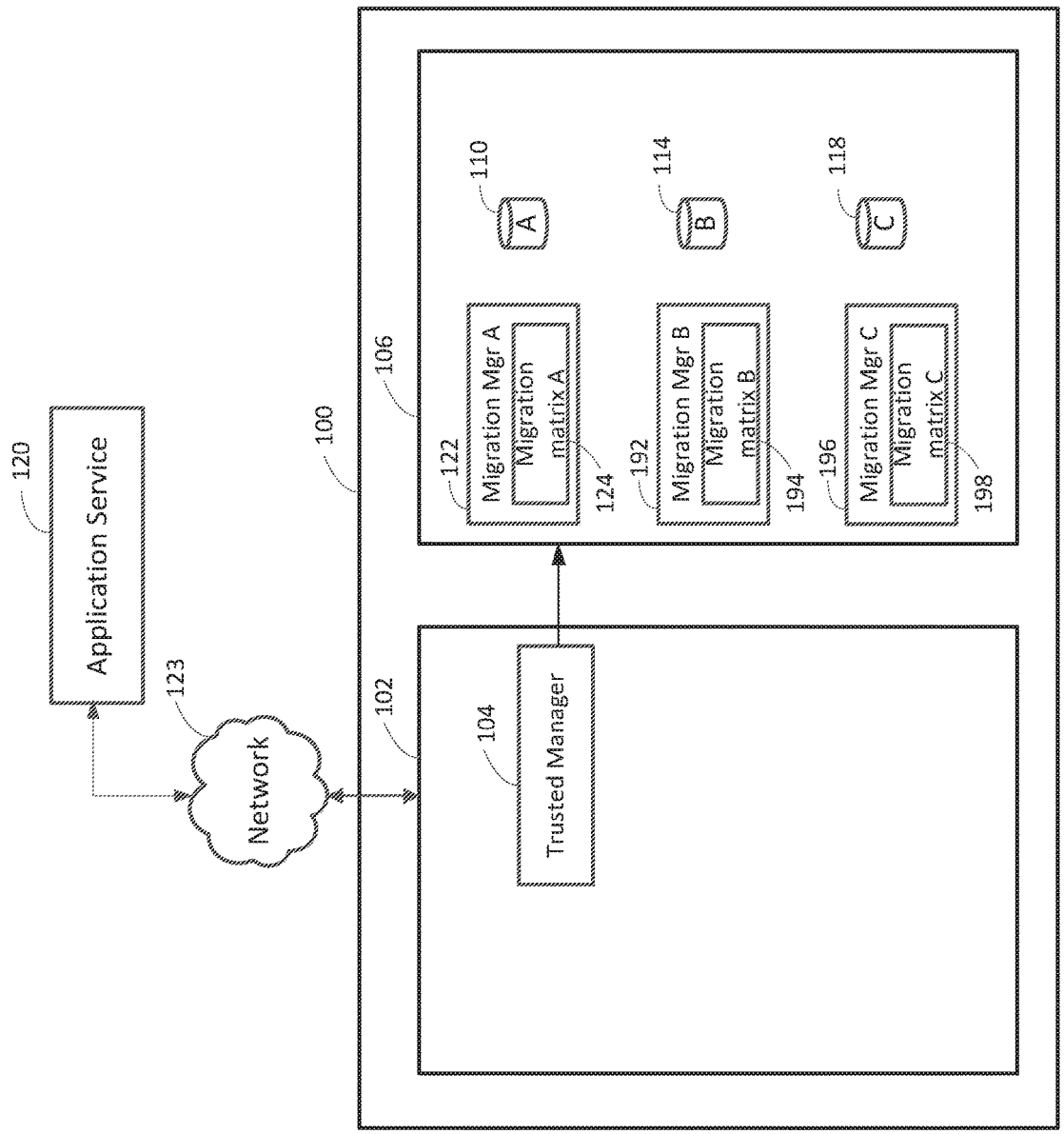
FIG. 13 is an alternate embodiment illustrating discrete migration managers.

Referring to FIG. 13, an alternate configuration of performing the update is discussed. In this embodiment, separate migration managers 122, 192, 196 are installed to individually handle updates to each respective personalization data 110, 114, 118. In one embodiment, each of the separate migration managers 122, 192, 196 may be installed and executed in parallel while in another embodiment the migration managers 122, 192, 196 may execute sequentially. In yet another embodiment, each of the migration managers 122, 192, 196 may be installed one at a time and executed individually and then deleted as described in more detail below. Performing personalization data updates with other combinations of migration managers as also possible.

Figure 14:
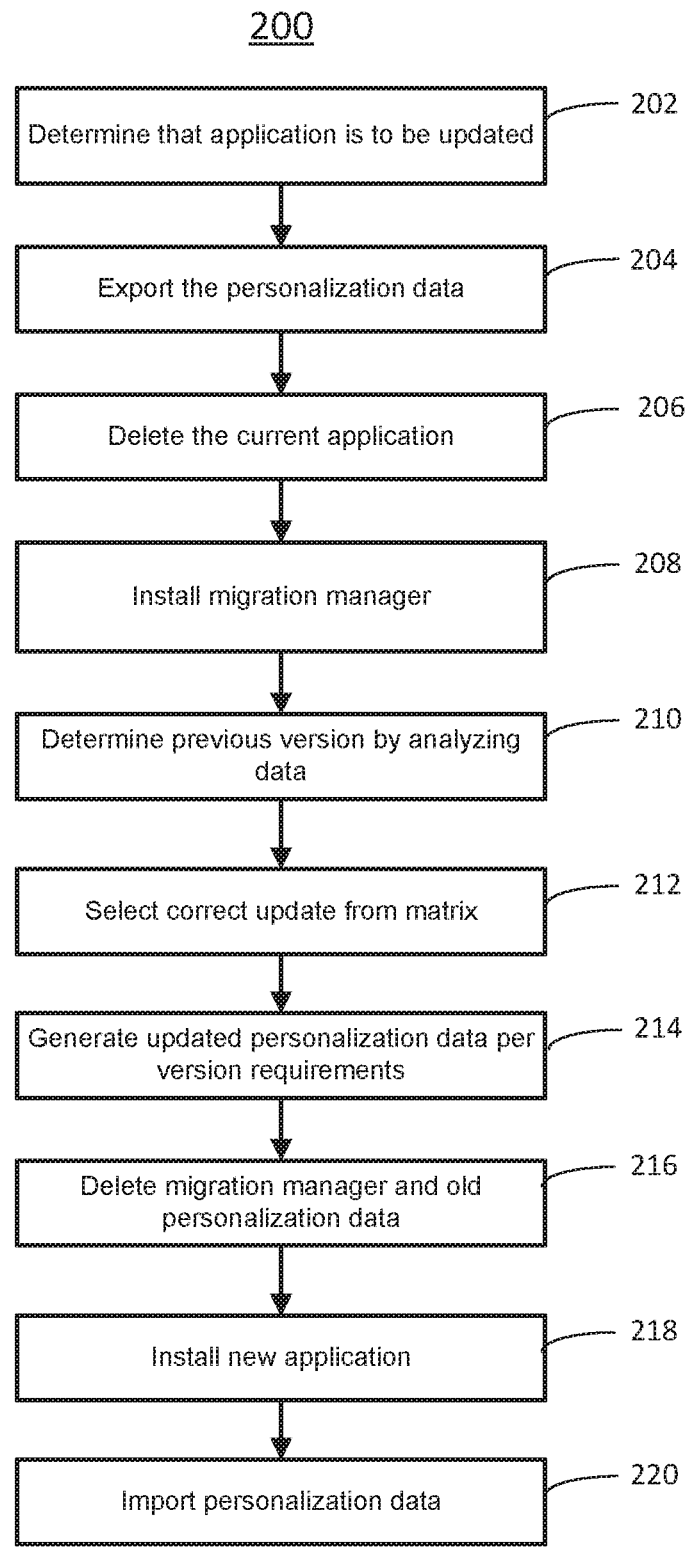
FIG. 14 is a flowchart of a method of performing an application update in accordance with the current disclosure.

FIG. 14 is a flowchart of a method 200 of performing update migration. At block 202, a determination may be made by a trusted manager 104 or other update manager 149 that one or more applications needs to be updated. A signal may be communicated to the application 108 to store its personalization data 110 so that the update may continue.

At block 206, after the data has been saved, the currently installed application may be deleted, making room for a migration application 122. The migration application 122 may be installed at block 208 and at block 210, the previous edition of the application 108 may be determined. In an embodiment, the migration application 122 may analyze the saved data 110 to determine the edition of the source. In another embodiment, the edition of the application 108 may be explicitly recorded in the saved data 110. In yet another embodiment, the trusted manager 104 may read the edition information as part of initiating the update process.

At block 212, after the prior edition information is determined, an update course of action may be determined using a migration matrix 124 of the migration application 122. The migration application 122 at block 214 may generate updated personalization data 126 according to the needs of the to-be-installed edition of the application. This may include re-formatting data, deleting or adding records, and populating any new records with default values.

The migration application 122 and, in one embodiment, the old personalization data 110 may be deleted at block 216. Deletion of the data may occur in a variety of appropriate ways. In one embodiment, the data is written over to delete it. In another embodiment, a pointer to the data in the memory is removed such that the processor no longer knows where the data to be deleted is located and will eventually overwrite it. As discussed above, the old personalization data 110 may be saved in case a rollback is required.

The new edition application 132 may be installed at block 218 using the memory space freed up by deleting the migration application 122. The process may be completed at block 220 when the updated data 126 is retrieved into the new edition application 132 and the application may be executed using the retrieved data 126.

The techniques described above may be used for any electronic device 100 that either operates with constrained memory or simply wishes to be conservative in its use of memory. Rather than putting a full suite of update tools in each edition of an application 132, 154, a trusted manager 104 or an update manager 149, after having the necessary application data saved, may delete the existing version and use that memory space to install and run a custom migration application that is tailored for each possible combination of updates. After the data migration is accomplished, the update manager may delete the migration application, freeing up space for the target version application. Since the application may be expected to be larger than the migration application, the total space required may be larger than the original install only by the size of the saved data and any increase in the new application. Because both the old and new data may be saved during the installation of the new application, rollback to the previous edition may be accomplished should the new application fail to install or execute. Because the personalization data is not transferred outside the secure element 106, the privacy and security of the information is protected during the update process, reducing or eliminating the need to have updates performed in a secure environment.

The use of a migration manager benefits both users and application designers. The application designers may focus on application development and separate the overhead of the actual installation and update of personalization data to a separate application, easing concerns about variable use and naming conventions. Application developers also may know they may use the full available memory space and not have to make design decisions based on saving space for upgrade code that never executes during normal operation and introduces another point of failure. Users may benefit from lower device costs when the cost of additional memory is not added onto a product simply to accommodate the update process. Users also may benefit by being able to perform updates without needed to delete phots in order to free memory to accomplish the upgrade.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of updating an application on a device comprising:
storing a current version of a personalization data set from a current edition application installed on the device, the current version of the personalization data being stored within a secure element so that the personalization data is not at risk for copying outside of the secure element;
deleting the current edition application after the current version of the personalization data is stored;
installing a migration application on the secure element of the device after deleting the current edition application, the migration application occupying at least a portion of the memory space freed by deleting the current edition application, wherein the migration application is temporarily installed for a sole function of updating the current version personalization data set to a next version personalization data set, and wherein the migration application has a matrix of conversions from a plurality of past versions of the application to the next edition application, the migration application separate from both the current edition application and a next edition application;
updating, via the migration application, the current version personalization data set to the next version personalization data set to meet a requirement of an updated application to be installed on the device;
deleting the migration application from the secure element after the migration application completes updating the current version personalization data set to the next version personalization data set;
installing the next edition application, the next edition application occupying at least a portion of the memory space freed by deleting the migration application; and
retrieving the next version personalization data to the updated application.

2. The method of claim 1, further comprising determining, via the migration application, a version of the current edition application by evaluating the stored current version of the personalization data.

3. The method of claim 1, wherein installing the migration application comprises a trusted manager installing the migration application.

4. The method of claim 1, wherein installing the next edition application comprises installing the next edition application in a memory of a secure element that is part of the device.

5. The method of claim 1, wherein installing the migration application comprises receiving the migration application from an application service connected to the device via a network.

6. The method of claim 1, further comprising:
storing a second personalization data set corresponding to a second current edition application;
processing, via the migration application, the second personalization data set to a next version second personalization data set that meets a requirement of an updated second application to be installed on the device;
installing the updated second application following deletion of the migration application; and
retrieving, via the updated second application, the next version second personalization data set to the updated second application.

7. The method of claim 1, further comprising repeating the "storing" through "retrieving" steps for each application of a plurality of applications installed on the device, using a separate migration application corresponding to each of the plurality of applications.

8. A system for updating an application over multiple versions in a limited memory environment, the system comprising:
a device including an operating platform and a secure element;
the operating platform including a trusted manager that manages interactions with the secure element; and
the secure element including a processor that executes a migration application that is temporarily installed on the secure element for a sole purpose of updating stored personalization data over a plurality of skipped updates for the application being updated, wherein the trusted manager deletes the application being updated after the personalization data is stored and prior to installing the migration application on the secure element, wherein the personalization data from the application is stored within the secure element so that the personalization data is not at risk for copying outside of the secure element, wherein the migration application is installed after deletion of the application and the migration application is installed at least in part in a memory previously occupied by the deleted application, wherein the migration application contains a migration matrix for performing an upgrade to data associated with the application, and further wherein the trusted manager deletes the migration application and the migration matrix from the secure element after the migration application completes updating the stored personalization data and prior to installing an updated version of the application.

9. The system of claim 8, wherein the migration application determines a current version of the stored personalization data prior to updating the stored personalization data.

10. The system of claim 8, wherein the trusted manager installs the updated version of the application that uses the updated stored personalization data, the updated version of the application installed at least in part in a memory previously occupied by the migration application.

11. The system of claim 8, further comprising an application service that makes available at least one version of the migration application for downloading by the trusted manager.

12. The system of claim 11, wherein the trusted manager determines a correct version of the migration application to install based on a latest available version of the updated application at the application service.

13. A method of updating an application on a limited memory device, the method comprising:
storing personalization data for an application to be replaced by an updated edition of the application within a secure element so that the personalization data is not at risk for copying outside of the secure element;
deleting the application after storing the personalization data;
installing a migration application on the secure element of the limited memory device, the migration application installed in at least a portion of the memory space freed by deleting the application, the migration application being temporarily installed on the secure element for a sole function of transforming the personalization data to an updated personalization data, the migration application separate from the application or any updated version of the application, the migration application containing a migration matrix;
determining a version of personalization data for an application that was deleted;
selecting, at the migration application, a transformation to apply to the personalization data based on the version determination;
applying the transformation to the personalization data to generate the updated personalization data;
deleting the migration application from the secure element after the migration application completes the transformation and prior to installation of the updated edition of the application; and
installing the updated edition of the application in at least a portion of the memory previously occupied by the deleted migration application.

14. The method of claim 13, further comprising:
signaling an application to export personalization data; and
deleting the application prior to installing the migration application.

15. The method of claim 14, further comprising:
importing the updated personalization data into the updated edition of the application.

16. The method of claim 14, wherein signaling the application to export the personalization data comprises signaling the application to export the personalization data to a space within the limited memory device.

17. The method of claim 13, wherein the limited memory device is a secure element.

* * * * *